United States Patent [19]

Russell

[11] Patent Number: 4,641,307
[45] Date of Patent: Feb. 3, 1987

[54] DATA PACKET TRANSMISSION USING SHARED CHANNEL

[75] Inventor: Brian M. Russell, Oldham, Great Britain

[73] Assignee: International Computers Limited, London, England

[21] Appl. No.: 582,183

[22] Filed: Feb. 21, 1984

[30] Foreign Application Priority Data

Feb. 22, 1983 [GB] United Kingdom ............... 8304950

[51] Int. Cl.$^4$ ..................... H04Q 11/04; H04J 3/02
[52] U.S. Cl. ........................................ 370/60; 370/85
[58] Field of Search .............. 370/85, 60, 94, 89, 370/99; 340/825.5

[56] References Cited

U.S. PATENT DOCUMENTS

| | | | |
|---|---|---|---|
| 4,387,425 | 6/1983 | El-Golary | 370/85 |
| 4,535,448 | 8/1985 | Baxter et al. | 370/85 |
| 4,568,930 | 2/1986 | Livingston et al. | 370/85 |

OTHER PUBLICATIONS

"Dual-chip sets forge vital link for Ethernet local-network scheme", *Electronics*, Oct. 6, 1982, pp. 89–103.

Primary Examiner—Robert L. Griffin
Assistant Examiner—Frank M. Scutch, III
Attorney, Agent, or Firm—Lee, Smith & Zickert

[57] ABSTRACT

In a data communication system an interface unit connects a device to a common communications channel shared with other devices using e.g. a carrier-sense multiple-access protocol. Individual bytes for a predetermined destination device are supplied by the device to communications controller 6 without any grouping into packets. They are then stored in a RAM 8 under control of a microcomputer 5. As soon as a byte is received, the interface unit attempts to transmit a packet; when the right to transmit is won the interface unit transmits a packet containing that and any subsequent bytes. The length of the packet therefore depends on the delay before a packet can be transmitted, and hence on the loading on the channel.

15 Claims, 3 Drawing Figures

DATA PACKET TRANSMISSION USING SHARED CHANNEL

BACKGROUND OF THE INVENTION

This invention relates to data communication systems, especially such as are suitable for use as local area computer networks.

In such a network the devices which are to communicate with one another often do so over a communications channel the use of which they share in the time domain. Access to the channel for each device is controlled by some form of interface device coupled between the device and the channel. Communication takes place by packets transmitted by the interface devices according to the particular protocol in use. Though the interface device often adds information of a framing nature, the data for the packet is supplied by the device, which is responsible for the amount of data to be included in the packet. Various examples of interface devices suitable for use when the protocol is of the type known as carrier-sense multiple-access with collision detection (CSMA/CD) are to be found in Electronics, Oct. 6, 1982, pages 89 to 105. However, if the device is sending data to a single destination, in accordance for example with a virtual connection already established between the two, the need for the device to be responsible for the amount of data in the packet requires an involvement by the device in low-level details of the communications procedure which we have realised is unnecessary.

SUMMARY OF THE INVENTION

This invention provides a method of transmitting data from a source device to a predetermined destination device in a system comprising a plurality of devices, a plurality of interface means, and a common communications channel, each device being coupled to the channel through an associated one of the said interface means, and each interface means acquiring the right to transmit a complete packet over the channel only at intervals in such a manner as to share use of the channel with other of the interface means, the method comprising transferring the data from the source devices to its interface means in individual data units with no indication of how the data units are to be grouped into packets, storing the units in storage means in that interface means, and, on at least some of the occasions that interface means acquires the right to transmit a complete packet, transmitting a packet comprising all the data units stored in the said storage means and not previously transmitted.

The device therefore simply transfers data units to the interface means, which formulates them into packets whose length in general depends on the number of data units to hand whenever the interface means has the right to transmit. This is to be distinguished from the known system in which the device itself determines the length of the packets, and e.g. passes data units in groups each of which is intended to form the data for a complete packet.

The manner in which an interface means acquires the right to transmit depends on the protocol. For example, the interface means may initiate action which leads to its acquiring the right to transmit a complete packet, in which case advantageously the interface means initiates the action in response to receipt or storage of any previously untransmitted data unit, and on acquiring the right to transmit a package transmits a packet containing that and any subsequently stored data units held when the said right is acquired. The action may then consist in sensing the channel to determine if a signal is already being transmitted (e.g. a carrier-sense multiple access protocol) the right to transmit a complete packet being acquired either when it is detected that there is no such signal, if collision detection is not used, or when transmission has survived the period in which a collision can occur, if collision detection is used.

An alternative is for the right to transmit a complete package to be allotted to an interface means whether or not it wishes to use it. Examples of suitable protocols are polling from a central unit or token passing in a decentralised system.

Normally a packet will contain, in addition to the data units, framing and/or address information. However, in the special case of a centralised system with polling it is possible for a packet to consist solely of the data units.

The method of the invention may be used subject to limitations, for example on the maximum number of data units that may be included in a packet, or the total number of data units that may be transmitted before an acknowledgement is received.

The invention also provides apparatus for coupling an associated device to a common communications channel to which are coupled plurality of other devices each through an interface means separate from the said interface apparatus, the interface apparatus in operation acquiring the right to transmit a complete packet only at intervals in such a manner as to share the use of the channel with the interface means of the other devices and comprising:

input means for receiving individual data units from the said associated device supplied without any indication of how they should be grouped into packets, storage means for storing data units received from the associated device and outputting means operative, on at least some of the occasions the interface apparatus acquires the right to transmit a complete packet, to output for transmission over the common communications channel a packet destined for a predetermined destination device and comprising all these data units stored in the storage means and not previously transmitted as part of a complete packet.

It further provides a communication system including such apparatus.

BRIEF DESCRIPTION OF THE DRAWINGS

One example of a system constructed and operating in accordance with the invention will now be described in greater detail with reference to the accompanying drawings, in which.

DESCRIPTION OF THE PREFERRED EMBODIMENT

Overall System

Figure 1:
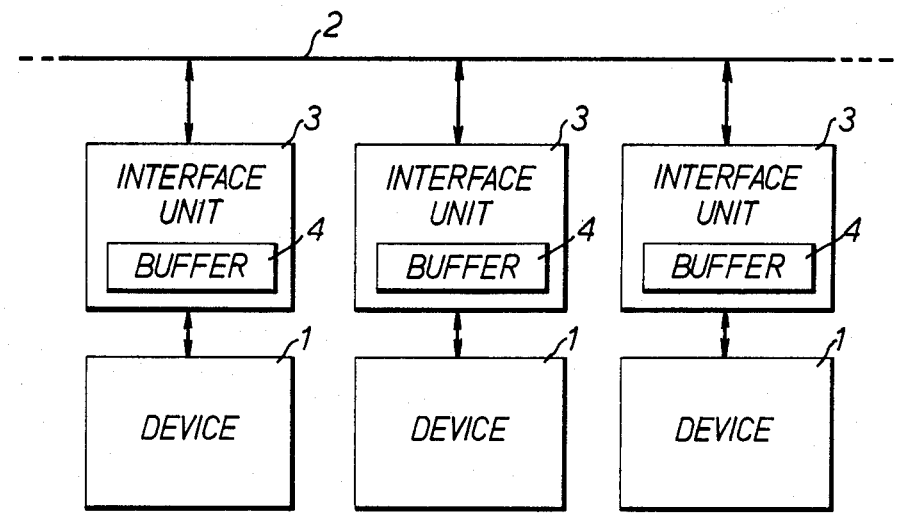
FIG. 1 is an overall block diagram of the system.

Referring to FIG. 1, this example of a system in accordance with the invention is a local area network in which a number of devices 1 communicate with one another over a common bus 2. The devices may, for example, be computers processors, computer peripherals or terminals.

Each device 1 is connected to the bus through an interface unit 3 which transmits data from the device 1 onto the bus and passes data from the bus to the device 1 if the data is addressed to the device. The interface units 3 control access to the bus jointly in a decentralised manner using a protocol of the CSMA/CD (carrier-sense multiple-access with collision detection) type.

Figure 3:
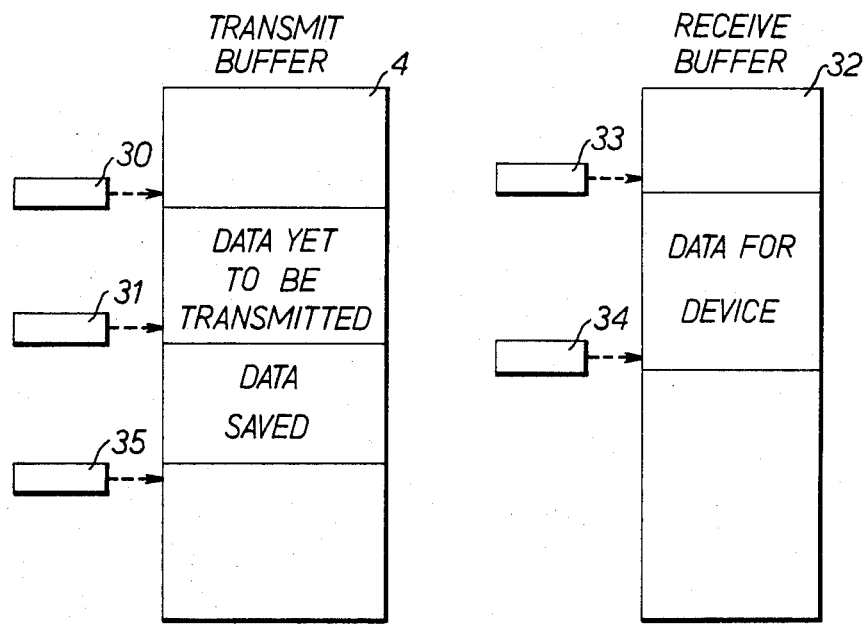
FIG. 3 is a diagram of the buffer storage of the interface system.

As shown in FIG. 3 there is only one device 1 for each interface unit 3. However a group of devices 1 may share a common interface unit 3. If a device 1 wishes to communicate with another of the devices 1 a connection between the two is first established by messages passed between their interface devices 3. Thereafter either of the devices simply passes data for the other to its own interface unit which formulates the data into packets and transmits them over the bus.

The data is passed from a device 1 to its interface unit in individual data units. The interface unit stores the data units as it receives them in a first-in first-out transmit buffer (FIFO) 4. Following the CSMA/CD protocol used in this system, as soon as the interface unit 3 has received and stored a data unit in its buffer 4 it attempts to transmit it. The interface unit senses the bus and if it detects that no signal is being carried by the bus it transmits a packet containing the data unit together with framing, addressing and control information. However, if a signal is detected the interface unit waits until the bus is silent before starting to transmit. Provided no other unit starts to transmit at the same time a complete packet will be transmitted; otherwise the resulting collision is detected by the interface units concerned which abandon their transmissions, back off for differing periods and then make further attempts to transmit.

If an interface unit does not acquire the right to transmit as soon as it receives a data unit in the buffer 4 it is likely to receive further data units before it succeeds in transmitting. When it does succeed it will include all these data units in the packet together with the framing information and other overheads. Consequently the length of a packet is not fixed, but varies with the load carried by the bus. If the loading is very light, packets are likely to contain only one data byte. The fraction of the time spent transmitting packets that is occupied by overheads rather than data from the device will therefore be relatively high, but at a time when that does not matter. However, the delay in transferring information across the network will be very low. On the other hand, when the load increases and contention occurs, the packets will become longer and the fraction of the packets taken up by overheads will shrink.

The devices themselves are not concerned in determining the packet length: they simply pass the data units to their interface units, which group them into packets without regard to their significance to the originating device. To the devices themselves the data units are likely to form part of longer messages in whatever higher level protocol is in use. These messages may contain actual user data or they may be control messages such as, for example Xon and Xoff. However, the interface units do not know, or need to know, where the breaks between the messages come.

Although the system will normally operate as described it is convenient to impose an upper limit on the number of data units that can be included in a packet.

Structure of the interface unit

Figure 2:
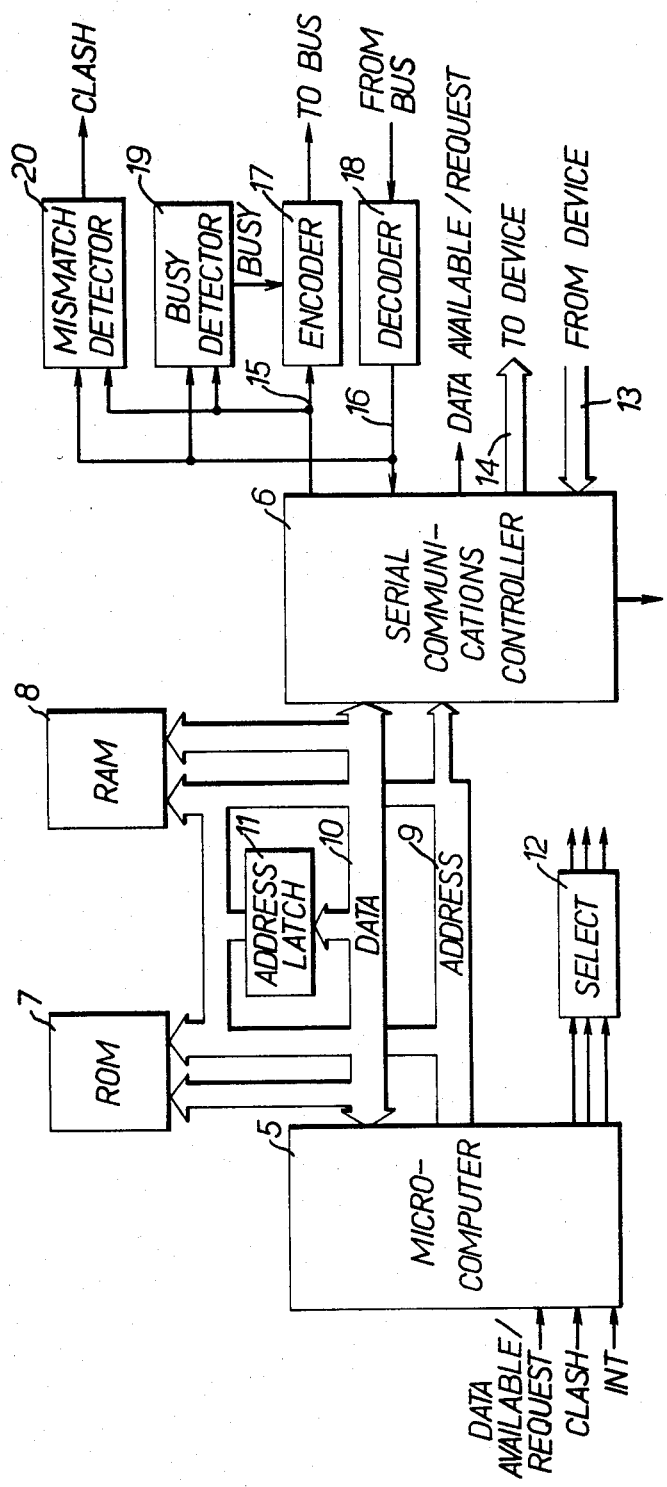
FIG. 2 is a block diagram of the interface unit of the system.

Referring to FIG. 2 the interface unit has a microcomputer 5, a serial communications controller 6, an external read-only memory (ROM) 7, an external random-access memory (RAM) 8, an address bus 9 and a data bus 10.

Address signals for the ROM 7 and RAM 8 are obtained partly from the address bus 9 and partly from an address latch 11 loaded in the known manner from the data bus 10. The ROM 7 holds the program for the microcomputer 5. The RAM 8, in conjunction with address pointers held in the internal storage of the microcomputer 5 (as will be explained in more detail subsequently) implements the transmit buffer 4 and a similar buffer for data received from the network.

The microcomputer 5 selects the individual components to write to them or read them by issuing signals to a select logic circuit 12, which consists as is well known in microcomputer based units, of standard combinational logic to decode the signals received and output the required signals to the individual units.

Suitable components for the microcomputer 5 and controller 6 are available commercially. For example, the microcomputer 5 may be an Intel 8031 and the controller 6 may be an AmZ8530.

The controller 6 has two serial ports. One port is connected by a set of incoming lines 13 and a set of outgoing lines 14 to the device 1 asociated with this controller. One line of each set 13 or 14 carries serial data and the remainder are control lines. These lines may, for example, be in accordance with the RS232C standard interface. The other port outputs serial data for the bus 2 on a line 15 and receives serial data from it on a line 16.

Data output on the line 15 is encoded in an encoder 17. Data from the bus 2 is decoded in a decoder 18. The encoding and decoding may be as described in our co-pending British patent application No. 8212263. The encoder 17 and decoder 18 are coupled to the bus 2, which may be a simple twisted pair, through transformers. The signal sent by the encoder 17 is received from the bus by the decoder 18.

The carrier-sense part of the access protocol for the bus 2 is carried out by a busy detector circuit 19. This circuit is connected to the lines 15 and 16 from the network and outputs a signal BUSY if it detects activity on the line 16 which has not been generated by the encoder 17. BUSY is applied to the encoder 17 to inhibit transmission from the encoder 17. The controller 6 then learns that the expected signal has not been transmitted via the decoder 18. The busy detector circuit 19 contains a delay circuit, implemented as a counter which is held at zero while there is activity on the line 16 but starts to count when the activity ceases. When the counter reaches a preset value the BUSY signal is removed allowing the controller 6 to start transmission over the line 15. The delay introduced by the counter allows the microcomputer 5 to finish dealing with existing tasks such as the receipt of incoming information.

The collision-detection part of the access protocol for the bus 2 is carried out by a mismatch detector 20 connected between the lines 15 and 16 and arranged to compare the signal sent over the line 15 with that received (after encoding and decoding delays) on the line 16. If the two do not match the packet has not been transmitted correctly and a signal CLASH is output and supplied to the microcomputer 5 as an interrupt. The reason for the mismatch may be a collision with a packet from another station, or the mismatch may have occurred for some other reason, for example because noise has corrupted a transmitted packet. Any attempt to transmit while BUSY is set is also reported to the microcomputer via CLASH since the transmitted message will not equal the silence (or other unit's packet) that is received.

Two further inputs to the microcomputer 5 both originate from the controller 6. One, to a second interrupt input, is a signal INT produced by the controller 6 when it starts to receive a packet from the network. The second is a signal DATA AVAILABLE/REQUEST which doubles as an indication that the controller 6 has a byte available from the network (during reception of a packet) or requires the next byte (during transmission of a packet).

The microcomputer 5 controls the controller 6 in the known manner by writing data into a command register in the controller.

Message format

Before describing the operation of the system it is helpful to set out the format of a packet as transmitted by the interface unit. It consists of the following sequence of fields:

| | |
|---|---|
| FLAG: | Binary 01111110 |
| DESTINATION: | Address of destination device |
| SOURCE: | Address of source device |
| CONTROL: | Value: 0 spare |
| | 1 in connect sequence |
| | 2 setting baud rate/parity |
| | 3 break |
| | 4 disconnect |
| | 5 data/acknowledgement |
| | 6 sequence error |
| | 7 spare |
| TRANSMIT SEQUENCE NO: | Sequence number of the first data byte in packet (in data/acknowledgement packets only) |
| ACKNOWL-EDGEMENT SEQUENCE NO: | In data/acknowledgement packets: sequence number of the last data byte passed to the associated device. In sequence error: the sequence number of the earliest byte whose re-transmission is requested. |
| LINE INDICATORS: | Copies of the states of the control lines from the associated device. |
| DATA: | (In data/acknowledgement only) up to the maximum allowed. |
| CYCLIC REDUNDANCY CHECK: | any of the known schemes for cyclic redundancy checking. |
| FLAG: | Binary 01111110 |

The control field indicates the type of packet. Only when it has the value 5 does it carry user data from the associated device. Values 1 to 3 are concerned with controlling the link between the two communicating devices. The use of the value 6 in the control field and the meaning of the sequence numbers will be described in more detail subsequently.

The flags and the cyclic redundancy check field are supplied by the communications controller 6. The intervening fields are supplied by the microcomputer 5; as supplied they have the form given above, but before transmitting them the controller 6 subjects them to bit stuffing to ensure that the flag pattern does not appear between the opening and closing flags. The use of flags and bit stuffing in this manner is well known in bit-oriented protocols such as that used here.

When data is received from the network the controller 6 "destuffs" the data (i.e. removes the bits inserted for bit stuffing) and checks the cyclic redundancy check field.

Operation of the system

The communications controller 6 assembles the individual data bits received from the associated device 1 into bytes in an internal buffer. The microcomputer 5 polls the controller 6 at frequent intervals and if it discovers that a complete byte is held it transfers the byte to itself. The microcomputer 5 also checks if the state of any of the control lines has been changed.

When the asociated device 1 wishes to communicate with another device 1 it signals to the interface unit 3 over the control lines and supplies the address of the other device. The microcomputer 5 then sends a packet to the interface unit 3 of the other device. If that is able to make a connection the far interface unit 3 returns an acknowledgement and sets the output control lines to its associated device 1 in response to the line indicators field of the packet to reproduce the state of the incoming control lines at the near end. The far device replies to indicate if it is ready to receive data and, if so, the connection between the two devices is established. The details of the dialogue are similar to those by which a virtual point-to-point connection is established in other networks and will not be described further.

In general, for all packets, the microcomputer 5 obtains the source address from a hardwired input and the destination address from internal storage. A change in the state of an input control line always leads to a packet's being sent and the corresponding output control lines at the far end being altered, so that (subject to a delay) the devices 1 seem directly connected by their lines 13 and 14.

Assume now that a connection is established between two devices and one wishes to send data to the other. It then simply passes the data bytes bit-serially to the communications controller 6. When that has assembled a byte the microcomputer 5 transfers it to itself and then writes it into a section of the RAM 8 which forms the transmit buffer 4 (see also FIG. 3). The byte is written into a location whose address is stored in a location 30 in the internal storage of the microcomputer 5. A location 31 in the internal storage of the microcomputer 5 holds the address of the next byte to be transmitted. As soon as a byte has been transferred into the RAM 8 the microcomputer 5 will signal to the controller 6 to send a packet.

If BUSY is asserted the controller 6 will be unable to transmit. Otherwise it will send the opening flag and then call over the DATA AVAILABLE/REQUEST line for the next and each subsequent byte of data as it is needed. The microcomputer 5 monitors this line, and each time a byte is requested supplies it. It supplies the initial control fields itself and then retrieves the data byte from the address indicated by the location 31. Assuming that is the only untransmitted byte the microcomputers then signals the controller 6 to end the packet, which causes the controller 6 to send the check field and the closing flag.

If a collision occurs the CLASH signal is generated, a burst of jamming is initiated and the microcomputer 5 is interrupted. It abandons the attempt to transmit and waits for a period before again attempting to transmit in the manner explained. Any suitable known back-off procedure may be used, though we prefer to make the back-off period proportional to the device address, with the constant of proportionality doubled (for two steps) on each failure to transmit and halved on each success. This is an especially simple method of attempting to separate competing stations.

If the microcomputer is waiting because the bus is busy or a collision has occurred it will write any further bytes received from the associated device 1 into the RAM 8, incrementing the address pointer in the location 30 as it does so. When it then finally succeeds in transmitting it will retrieve each of these bytes in turn for dispatch to the controller 6. During this procedure, for reasons of speed the address concerned is held in an internal register whose contents are incremented as each byte is stored. At the end of the packet the location 31 is updated with the contents of this register.

The arrival of a packet at the interface unit 3 from the network causes the signal INT to interrrupt the microcomputer 5, which then monitors the DATA AVAILABLE/ REQUEST line, and retrieves the bytes of the packet as they are received following the flag. If the packet is addressed to the associated device the data is written into a receiver buffer 32 section of the RAM 8 starting at the address whose value is held in a location 33 in the microcomputer 5. During arrival of the packet the buffer address is again obtained from the internal register and the location 33 is updated at the end of the packet. After the packet has been received the individual bytes are transferred one by one to the associated device using the contents of a location 34 in the microcomputer's internal storage as the address pointer.

Bytes for transmission over the network are numbered in sequence modulo the size of the transmit buffer 4, which is filled cyclically, so the sequence number of a byte equals its address in the transmit buffer 4. The sequence number of the first byte of each packet is included in its transmit number field. If the receiving interface unit detects an error in the sequence number (for example because a packet has been lost through noise) it sends a sequence error packet (control field=6) indicating the lowest sequence number not correctly received. The transmitting unit then sends a packet repeating the data units starting from that number.

Provided packets are received in sequence the far device returns the sequence number of the last data byte passed to its device in the acknowledgement sequence number field of its next packet containing data. If the far device is temporarily silent, data frames with no data are sent at regular intervals to acknowledge successful receipt. A limit may be placed on the number of bytes passed to the far device without its interface unit 3 attempting to acknowledge successful receipt. In an alternative arrangement, the acknowledgement sequence number field contains the sequence number of the last data byte received from the bus 2.

Unacknowledged bytes must not be overwritten in the transmit buffer 4 since they may need to be retransmitted. So the microcomputer 5 holds the address of the last byte acknowledged in a location 35, and if it is in danger of being overwritten signals the associated device to pause.

Various limitations are imposed on the number of bytes in a packet. First, there is an upper limit on the number that may be included. When that limit is reached no more data is included in the packet and the unit must make a later attempt to transmit any further bytes that are stored. Secondly, packets are split at the boundary of the transmit buffer. However, in normal operation while none of these limits are exceeded each packet contains all those bytes stored in the transmit buffer at the time the unit acquires the right to transmit a complete packet; that is, those bytes which have been stored since it last sent a data packet.

As an example of suitable numbers, the maximum number of data bytes in a packet may be 32, the transmit or buffer and receive buffer may each hold 256 bytes and the largest allowable number of unacknowledged bytes may be 128.

Modifications

Any of the known methods of carrier sensing and collision detection may be used in the place of those described. The system described may be modified by applying BUSY to unset a clear-to-send input on the controller 6, thereby inhibiting transmission on the line 15. Another possibility is to supply BUSY to the microcomputer 5. It may then itself cause transmission to be postponed.

The system described may be modified to carry out a simple CSMA protocol if the mismatch detector is omitted. Units then depend on the absence of an acknowledgement to detect a collision. It is convenient in that case for an acknowledgement to be returned in the period immediately after the transmission in which other units are prevented from transmitting.

If the busy and mismatch detectors are replaced by apparatus for recognising and generating tokens the system may be used as a token ring or bus.

As in the case of a ring, the communications channel may provide a more complicated interconnection medium than a simple passive bus.

It will be realised that the address pointers for the transmit and receive buffers may be implemented as special purpose registers rather than in the microcomputer 5.

In the system so far described, only data addressed to a device is written into its receive buffer 32. As an alternative, each interface unit 3 writes all received packets into its receive buffer 32. This allows the microcomputer 5 to interrogate the controller 6 in the known manner to test the cyclic redundancy check before examining the packet's address fields. Only if the check shows a valid packet and the packet is addressed to the associated device is the location 33 updated. This arrangement also has advantages in speed during reception of a packet, but does require that all interface units 3 ensure that there is always sufficient free space in their receive buffer 32 to receive a maximum length packet.

One or more of the devices 1, instead of being a source or sink of data, may be a gateway to another network. For example, two interface units as described may be connected together to interconnect networks to which they are coupled.

The acknowledgement sequence field may be omitted and acknowledgements sent as separate high-level messages to the device itself, which then informs its interface unit. That however requires some involvement of the device in details of the low-level protocol. Alternatively, the interface units themselves may send separate acknowledgement messages.

I claim:

1. A method of transmitting data from a source device to a predetermined destination device in a system comprising a plurality of devices, a plurality of interface means, and a common communications channel, each device being coupled to the channel through an associated one of the said interface means, only one of the interface means at a time being permitted to transmit a packet over the channel, the method comprising transferring the data from the source device to its interface means in individual data units with no indication of how the data units are to be grouped into packets, storing the units in storage means in that interface means, and, when the interface means is permitted to transmit a packet, transmitting a packet comprising all the data units stored in the said storage means and not previously transmitted.

2. A method as claimed in claim 1 in which the interface means formulates the complete packet by adding control information to the data unit or units of the packet.

3. A method as claimed in claim 2, in which the control information comprises framing and addressing information.

4. A method as claimed in claim 2, in which the said predetermined destination device is selected by the said source device and indicated in the packet by a destination address inserted by the interface means.

5. A method as claimed in claim 1, in which every data unit included in a transmitted packet is retained in the said storage means until its receipt is acknowledged, a failure to acknowledge any data item leading to its being retransmitted in a packet including, provided any predetermined limit is not exceeded, that data item and any data item stored in the storage means subsequently to it.

6. A method as claimed in claim 1, in which each interface means operates to determine if a signal from one of the other interface means is being transmitted over the communication channel, and to defer transmission of a packet until after if has been detected that no such signal is being transmitted.

7. A method as claimed in claim 1 in which, when the interface means is permitted to transmit a packet, it transmits a packet containing all data units stored in its storage means and not previously transmitted up to a predetermined limit.

8. Interface apparatus for coupling an associated device to a common communications channel to which are coupled a plurality of other devices each through an interface means separate from the said interface apparatus, the interface apparatus in operation being permitted to transmit a packet only at intervals in such a manner as to share the use of the channel with the interface means of the other devices and comprising:
(a) input means for receiving individual data units from the said associated device supplied without any indication of how they should be grouped into packets,
(b) storage means for storing data units received from the associated device and
(c) outputting means operative, when the interface apparatus is permitted to transmit a packet, to output for transmission over the common communications channel packet destined for a predetermined destination device and comprising all those data units stored in the storage means and not previously transmitted as part of a packet.

9. Apparatus as claimed in claim 8, in which there is included means for adding control information to the data unit or units to be transmitted in a packet to complete the packet.

10. Apparatus as claimed in claim 9, in which the control information comprises framing and addressing information.

11. Apparatus as claimed in claim 9, in which the address of the said predetermined destination device is in operation stored in the interface apparatus and included in each packet.

12. Apparatus as claimed in claim 8, in which the outputting means is subject to a limit on the data units that may be included in a complete packet.

13. Apparatus as claimed in claim 8, in which there is included means for distinguishing between those stored data units that have been transmitted and those that have not, and means for distinguishing between stored data units which have been acknowledged and those that have not, and the outputting means is responsive to a failture to acknowledge data units to retransmit some at least of the previously transmitted but unacknowledged data units.

14. Apparatus as claimed in claim 8 including means for sensing to determine if a signal not from the interface apparatus is being transmitted over the communications channel, and for deferring transmission of a packet until after it has been detected that no such signal is being transmitted.

15. A data communication system comprising a communications channel, a plurality of devices, a plurality of interface means each connecting an associated one of the devices to the channel, and means for permitting only one of the interface means at a time to transmit a packet over the channel, wherein each interface means comprises:
(a) input means for receiving individual data units from the said associated device applied without any indication of how they should be grouped into packets,
(b) storage means for storing data units received from the associated device and
(c) outputting means operative, when the interface means is permitted to transmit a packet, to output for transmission over the communications channel packet comprising all those data units stored in the storage means and not previously transmitted as part of a packet.

* * * * *